United States Patent [19]

Bolt

[11] E Re. 28,613

[45] Reissued Nov. 18, 1975

[54] SHOWER CABINET

[76] Inventor: Harry Collett Bolt, Penn Road, Knotty Green, Beaconsfield, Buckinghamshire, England

[22] Filed: Apr. 23, 1972

[21] Appl. No.: 353,877

Related U.S. Patent Documents

Reissue of:

[64] Patent No.: 3,646,590
Issued: Feb. 29, 1972
Appl. No.: 27,921
Filed: Apr. 13, 1970

[52] U.S. Cl. ..... 4/146; 312/258
[51] Int. Cl. ..... A47k 3/23
[58] Field of Search ..... 4/145–147, 4/156, 288; 135/5 B; 312/138, 271, 258; 52/35, 71

[56] References Cited

UNITED STATES PATENTS

| | | | |
|---|---|---|---|
| 31,912 | 4/1861 | Schooley | 4/146 |
| 118,750 | 9/1871 | Scholl | 4/146 |
| 462,125 | 10/1891 | Grant | 4/146 |
| 706,069 | 8/1902 | Knickerbocker | 4/146 |
| 979,973 | 12/1910 | Leo | 4/146 |
| 1,035,002 | 8/1912 | Guioness | 4/146 |
| 1,510,596 | 10/1924 | Kennedy | 4/146 |
| 1,566,387 | 12/1925 | Fifield | 4/146 |
| 1,750,284 | 3/1930 | Rusatz | 4/146 |
| 3,449,770 | 6/1969 | Casebolt | 4/146 |

FOREIGN PATENTS OR APPLICATIONS

| | | | |
|---|---|---|---|
| 1,219,054 | 12/1959 | France | 4/145 |
| 988,757 | 5/1951 | France | 4/146 |
| 966,878 | 3/1950 | France | 4/146 |
| 841,595 | 2/1939 | France | 4/146 |
| 188,469 | 1/1957 | Austria | 4/146 |

*Primary Examiner*—John W. Huckert
*Assistant Examiner*—Stuart S. Levy
*Attorney, Agent, or Firm*—William Anthony Drucker

[57] ABSTRACT

A shower cabinet which is collapsible so that when not in use it occupies small depth and comprises a back structure having a bottom tray, roof, and two sidewalls, all pivoted to the back structure, means to effect a waterproof engagement between the sidewalls and the tray, and a front closure member.

15 Claims, 13 Drawing Figures

SHOWER CABINET

Matter enclosed in heavy brackets [ ] appears in the original patent but forms no part of this reissue specification; matter printed in italics indicates the additions made by reissue.

This invention relates to cabinets in which people may take a shower. The conventional shower cabinet is a built-in rigid structure which occupies a space too large to be accommodated in most bathrooms and in any case occupies space only required for a few minutes each day.

According to the present invention we provide a shower cabinet which is collapsible so that when not in use it occupies a space of small front-to-back depth but can readily be opened to accommodate a person in a waterproof space including a back structure of small depth, a tray pivotally attached to the back structure and movable from a vertical position adjacent the back structure to an extended approximately horizontal position near floor level, a roof attached to the back structure and movable from a collapsed position adjacent the back structure to an extended overhead position, and two pivoted sidewalls attached to the back structure movable from collapsed positions adjacent the back structure to extended positions approximately at right angles to the back structure, means to effect a waterproof engagement between the two sidewalls when extended and the tray, and a front closure member movable from a position adjacent the back structure to a position at the front of the cabinet in the open condition. Thus the cabinet when closed can be almost flat against a wall or built into a recess in a wall. The invention can be usefully fitted in existing houses or new houses and is useful also for hotels, ships, caravans and other habitable structures. The tray and roof may meet each other in the vertical positions or may be spaced apart. For example, the tray may have its bottom plate extended to form a tread plate which may cover a space between the tray and roof in the vertical positions. When in the vertical position the roof may cover taps, toothbrush and soap holders and other appurtenances.

The tray may be connected to the roof so that lowering of the tray automatically raises the roof. Weights or springs or even power operated means may be used to assist or effect opening and/or closing of the tray and roof and/or other parts. Or a hand lever may be provided for the purpose which may operate through toggles or lazytongs.

The front wall of the cabinet may be a hanging sheet, roller blind, or folding panels.

The cabinet when folded may have a neat and pleasing appearance like a wardrobe or cupboard which may match other furniture or fittings.

The cabinet may be provided with an overhead water tank having an electric immersion heater. Means may be provided to extract or condense steam.

Two cabinets may be provided back to back within the wall depth between adjoining rooms.

The invention will be further described by way of example with reference to the accompanying diagrammatic drawings wherein.

Figure 1:
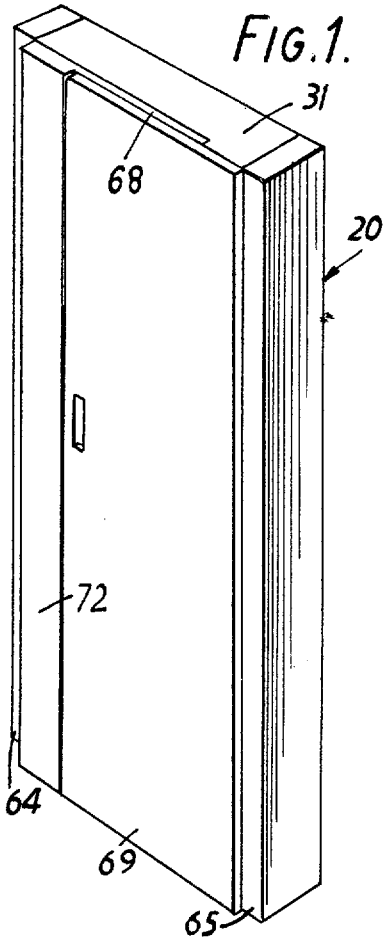
FIG. 1 is a perspective view of a shower cabinet in closed condition made in accordance with the invention.

In FIGS. 1 to 11, the cabinet comprises a back structure 20 attached to the wall 21 of a bedroom or bathroom and consisting of a flanged backplate 22 to which is fixed two fixed rigid side wood walls 24, 25 lined with waterproof plastic sheet 26, 27. The backplate 22 is extended forwardly at the top to form a top plate 30 stiffened by a board 31. The backplate 22 is also formed with a forward bulge 32. Water pipes 33 (FIG. 6) are housed between the plate 22 and the wall 21 and are connected to a mixing valve 35 housed in the bulge 32 and to a spray nozzle 36. The lower end of the backplate has a watertight connection with a channel or trough 38 connected with an overflow space 39 and drainpipe 40. The trough is covered by a skirt board 41.

Figure 9:
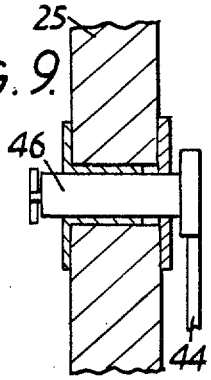
FIG. 9 is a section on line 9—9 on FIG. 4.

A tray 42 in the form of a rigid structure is mounted on bars 43, 44 which are pivoted at 45, 46 to the fixed sidewalls 24, 25. A sectional view of one of these pivots is shown in FIG. 9. The tray is movable about the pivots from a vertical position adjacent the back structure to an extended approximately horizontal position near but above floor level so as to be just above the level of the trough 38 and its upper surface when extended is inclined down to drain into the trough. The tray carries legs 49 which are pivoted so as to gravitate to the supporting positions from the collapsed positions as the tray is pulled down.

A roof 50 in the form of a rigid inverted tray is carried by similar bars 51 and pivots 52. The roof lies vertically against the back structure in closed condition and can be moved pivotally to an extended overhead approximately horizontal position.

The tray and roof in closed condition lie within the back structure which is of very small depth back to front.

Figure 4:
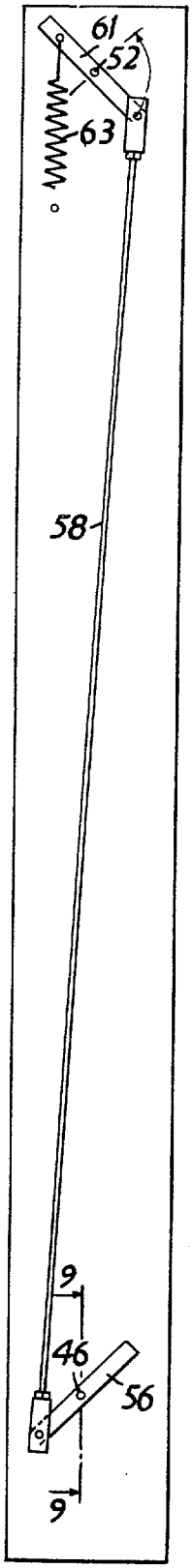
FIG. 4 is a side elevation with cover panel removed.
Figure 5:
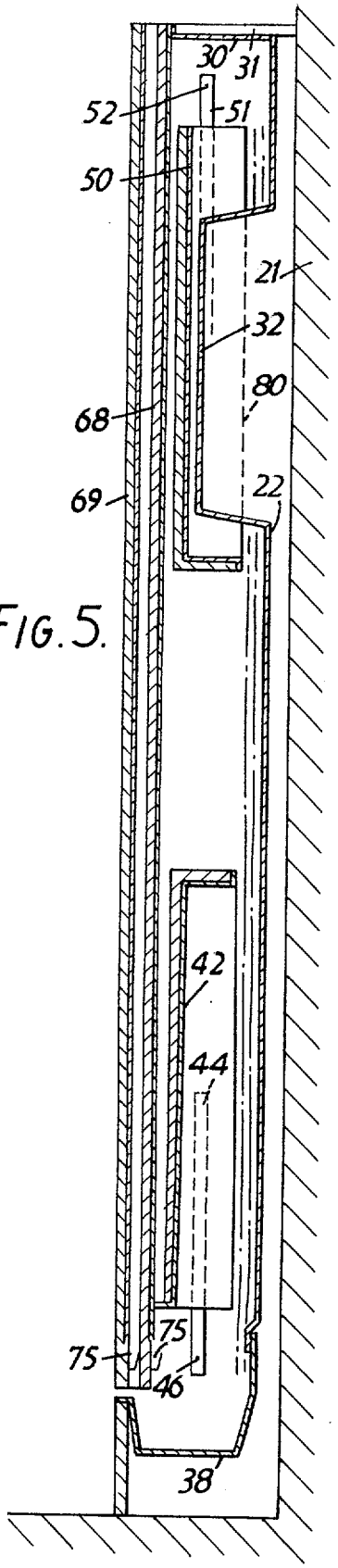
FIG. 5 is a vertical section view of the closed cabinet omitting pipe details.
Figure 6:
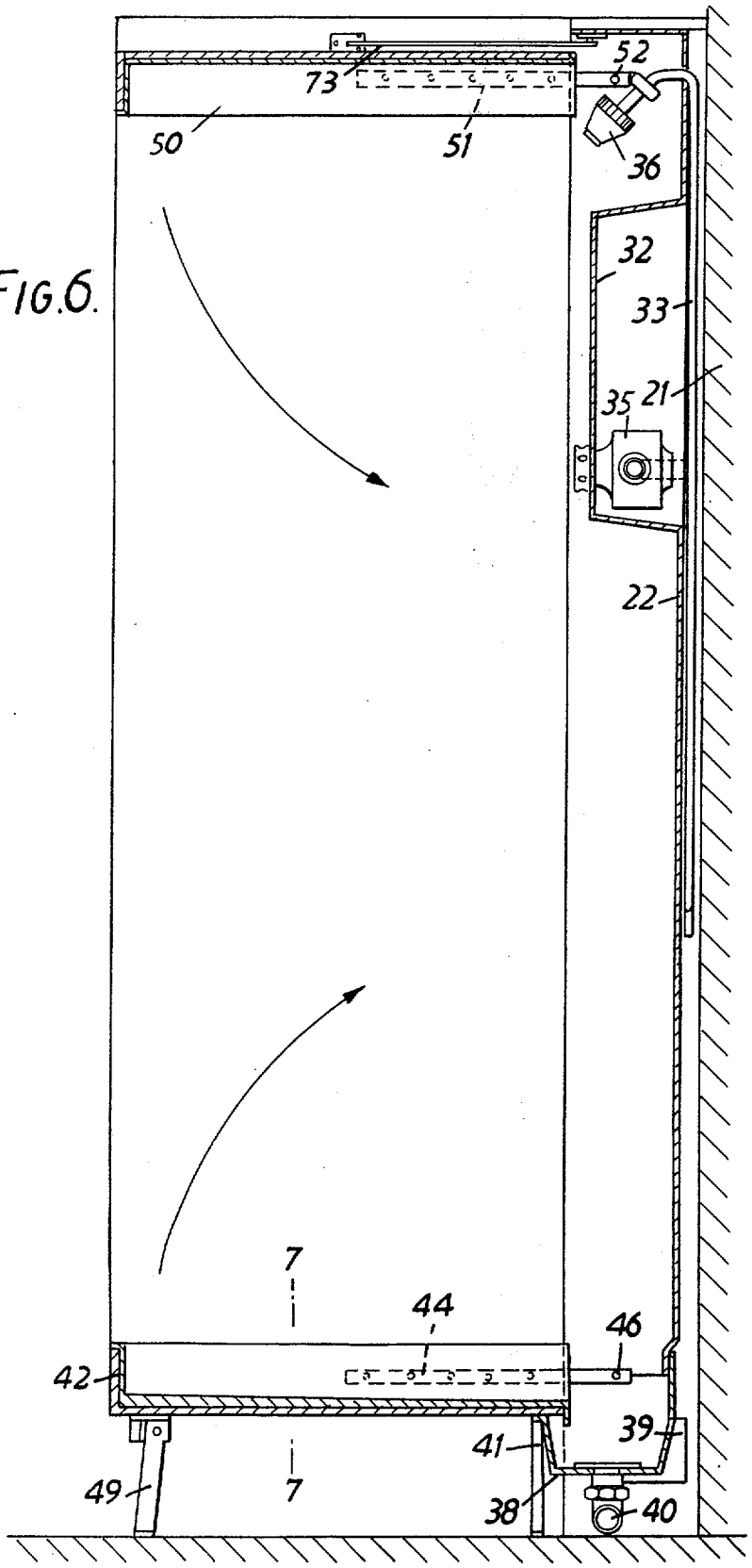
FIG. 6 is a vertical section of the cabinet in open condition.

The tray pivots 45, 46 pass out through the walls 24, 25 and on their outer ends they carry links 55, 56 which are connected by rods 57, 58 to links of which one is shown at 61, FIG. 4. The links 61 are connected to the pivots 52 which are urged by springs 63. By these means when the tray is moved up to its closed position the roof is automatically moved to its closed position assisted by the spring 63. The links, rods and spring are enclosed by boxlike side structures 64, 65 comprising part of or fixed to the back structure.

Figure 8:
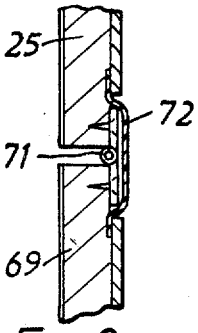
FIG. 8 is a horizontal section of a hinge.

Pivotally movable sidewalls 68, 69 in the form of rigid panels are provided by vertical hinges 70, 71 to the front edges of the fixed sidewalls 24, 25. The wall 25 is deeper than the wall 24 so that the hinge 71 stands forward of the hinge 70 whereby in the closed condition the walls 68, 69 serve as doors overlapping each other to lie flat against the cabinet. A makeup piece 72 is fixed on the wall or door 68 so as to be flush with the wall or door 69. By reason of this overlapping the cabinet is deep enough to accommodate a person. In the open condition the tray and roof lie between the walls 68, 69. The hinges 70, 71 may be covered with plastic strips as shown in FIG. 8. Stay members 73 may be provided to hold the walls 68, 69 open parallel to each other.

Figure 7:
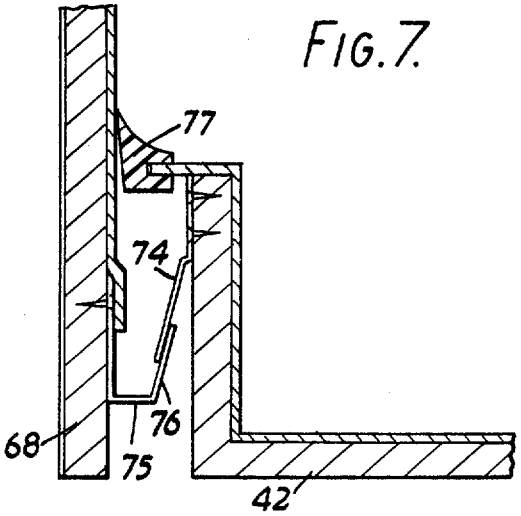
FIG. 7 is a section on line 7—7 on FIG. 6.

A waterproof joint is provided between the walls 68, 69 and tray 42. For this purpose a plate 74 inclined from the upper edge outwards is fixed to each side of the tray extending along the length of the side of the tray (FIG. 7). Fixed to the inside of each wall 68, 69 is a channel 75 having an inner wall 76 that is in inclined disposition corresponding to the plate 74. The uppr side edges of the tray carry rubber sealing strips 77. Thus when the tray is pulled down and stood upon by the user, the plates 74 press on the walls 76 with a wedge action so as to pull the two walls 68, 69 tightly against the sealing strips 77. The channels 75 provide a safety measure to catch any drippings of water and carry them back into the trough 38.

Figure 10:
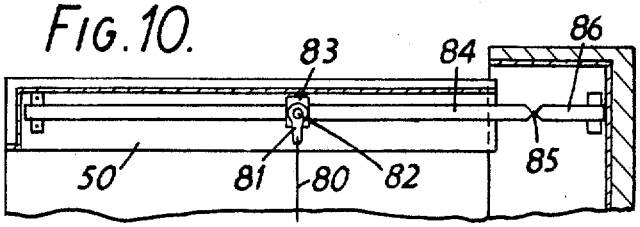
FIG. 10 is a side view and FIG. 11 is a part front view of details of a front wall of the open cabinet.
Figure 11:
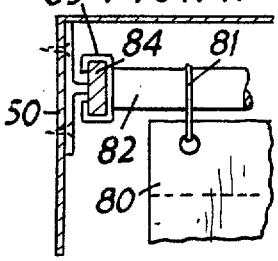
Figure 2:
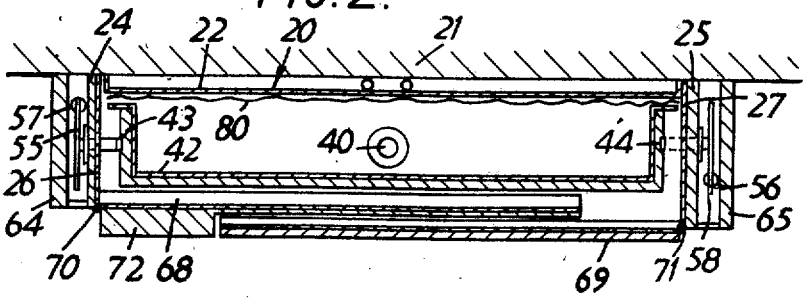
FIG. 2 is a sectional plan view of the lower part thereof.
Figure 3:
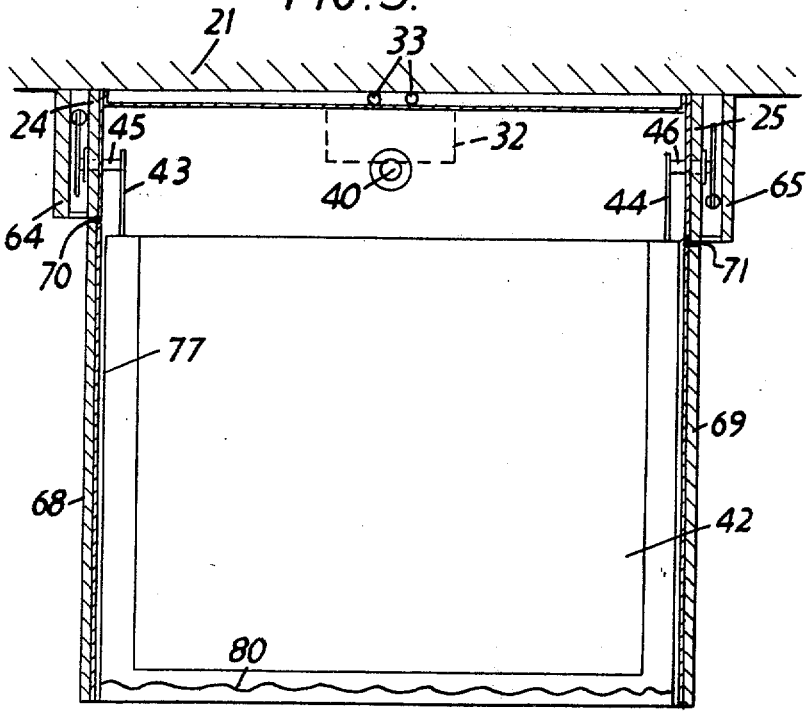
FIG. 3 is a sectional plan view of the lower part thereof in open condition.

The front of the open cabinet is covered by a front wall or closure member which in this example is a flexible curtain 80 (FIGS. 10 and 11). This is carried by hooks 81 on a curtain rod 82. The rod is carried by sliders 83 on rails 84 mounted on the roof. The rails are pivoted at 85 to fixed extensions 86 so that the curtain can be moved back within the back structure. *The forward and retracted positions of the curtain support member 82 are in a common horizontal plane.* If desired, the extensions 86 can be notched to hold the curtain sliders 83 against inadvertent forward movement.

The tray, roof and pivoted sidewalls 68, 69 are all shown as wood panels with a lining of rigid waterproof plastic sheet.

Figure 12:
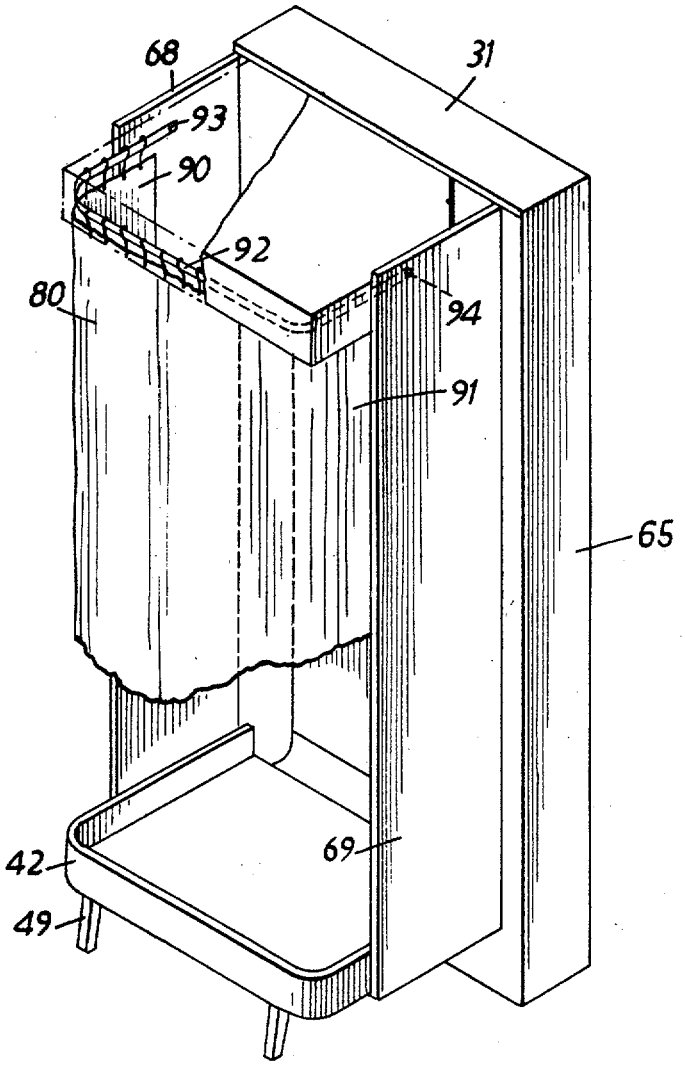
FIG. 12 is a perspective view and FIG. 13 a plan view showing a modified form of cabinet.
Figure 13:
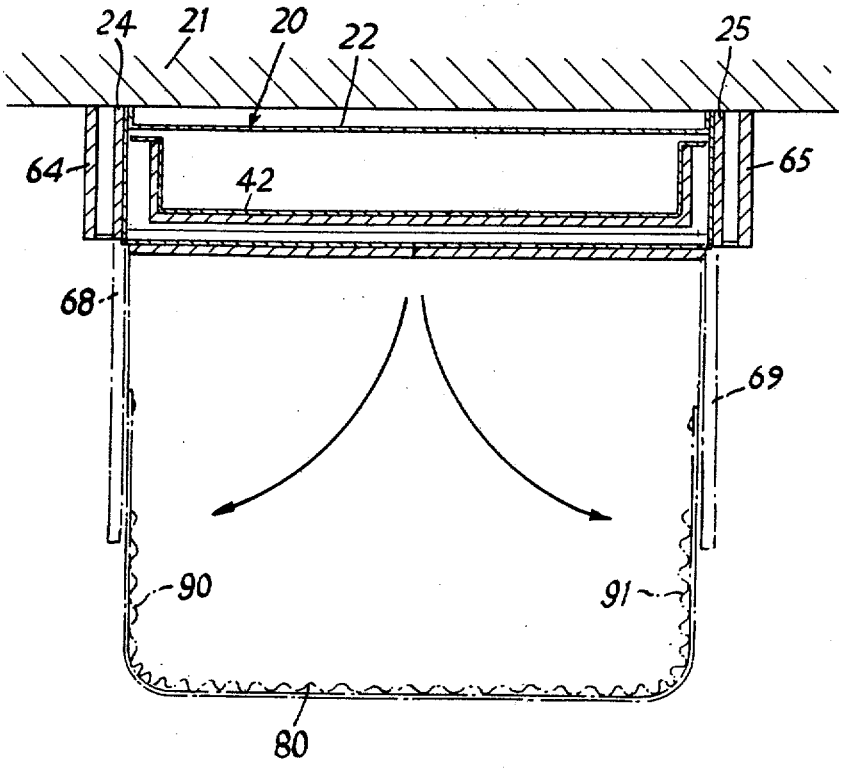

If desired, the walls or doors 68, 69 instead of overlapping may meet on the vertical centerline of the cabinet in which case they may be too short to provide sufficient space for the user. In this case as shown in FIGS. 12 and 13 the curtain 80 may be extended to have side wings 90, 91 so that in effect the curtain is a shallow U shape in plan. The wings 90, 91 thus form extensions of the walls 68, 69. In this arrangement the curtain may be carried on arms or a U-shaped bar 92 pivoted at 93, 94 so that the curtain can be swung back into the back structure or brought forward to the extended position.

I claim:

1. A shower cabinet which is collapsible so that when not in use it occupies a space of small front-to-back depth but can readily be opened to accommodate a person in a waterproof space including a back structure of small depth, a tray pivotally attached to the back structure and movable from a vertical position adjacent the back structure to an extended approximately horizontal position near floor level, a roof attached to the back structure and movable from a collapsed position adjacent the back structure to an extended approximately horizontal overhead position, and two pivoted rigid sidewalls attached to the back structure movable from collapsed positions adjacent the back structure to extended positions, approximately at right angles to the back structure, means effecting a waterproof engagement between the two sidewalls when extended and the tray, and a front closure member movable from a position adjacent the back structure to a position at the front of the cabinet in the open condition.

2. A shower cabinet as claimed in claim 1, wherein the two sidewalls are rigid panels pivotally attached to the fixed back structure, the tray and roof are both rigid structures pivoted to the fixed structure and the tray and roof are located between the two pivoted sidewalls when the cabinet is open, and are covered by the two pivoted sidewalls when the cabinet is closed.

3. A shower cabinet as claimed in claim 1, wherein the fixed structure comprises a backplate and two fixed narrow sidewalls attached to the backplate, said pivoted sidewalls being pivoted to the fixed sidewalls, and said tray and roof and front closure member being all housed between the fixed narrow sidewalls in the closed condition of the cabinet.

4. A cabinet as claimed in claim 2, wherein the pivoted sidewalls form two doors in the form of rigid panels which overlap one another in the closed positions.

5. A cabinet as claimed in claim 1, wherein the tray is above floor level and a water trough is provided within the fixed structure below the level of the tray, and channels carried by the pivoted sidewalls adjacent the tray extend back to the trough.

6. A cabinet as claimed in claim 1, wherein cooperating wedge means are provided on the sides of the tray in adjacent parts of the pivoted sidewalls whereby the lowering of the tray pulls the sidewalls tightly against the sides of the tray.

7. A cabinet as claimed in claim 1, wherein the tray and roof are connected by connecting means whereby the lowering of the tray raises the roof.

8. A cabinet as claimed in claim 7, wherein the connecting means are located against the outside of the fixed sidewalls and are enclosed by covering panels.

9. A cabinet as claimed in claim 1, wherein the front closure means is a flexible member carried on a bar which can be housed within the fixed structure and can be pulled out to its front position.

10. A cabinet as claimed in claim 1, wherein the tray has legs which automatically move from a collapsed position to a supporting position when the tray is moved down to its horizontal position.

11. A cabinet as claimed in preceding claim 1, wherein the fixed backplate is recessed to house pipes between it and a wall of a house and has a projecting part housing a water mixing valve.

12. A cabinet as claimed in claim 9, wherein the bar enters retaining notches in the closed position.

13. A cabinet as claimed in claim 1, wherein the pivoted walls meet in closed positions on the centerline of the cabinet and the front closure member is a flexible curtain of U shape in plan view in the open condition so as to form extensions to the sidewalls.

14. A shower cabinet which is collapsible so that when not in use it occupies a space of small front-to-back depth but can readily be opened to provide a space to accommodate a person, said cabinet including a back structure of smaller depth than said space including two rigid sidewalls, a rigid tray pivotally attached to the back structure and movable from a collapsed vertical position adjacent the back structure to a forwardly extended approximately horizontal position near floor level, a roof attached to the back structure and movable from a collapsed position adjacent the back structure to a forwardly extended approximately horizontal overhead position, means connecting the tray and roof whereby the lowering of the tray raises the roof, and two rigid sidewalls one of which is wider than the other and which are pivoted to the said sidewalls respectively and movable from collapsed positions adjacent the back structure in which they serve as doors and in which one of the sidewalls overlaps the other, to forwardly extended positions, approximately at right angles to the back structure, means effecting a waterproof engagement between the two sidewalls when extended and the tray, a water trough within the fixed structure below the level of the tray, channels carried by the pivoted sidewalls adjacent the tray extending back to the trough, a front closure curtain, and support means supporting said curtain and movable from a collapsed position adjacent the back structure to a position at the front of the cabinet in the open condition, in which the curtain serves as a front closure.

*15. A shower cabinet which is collapsible so that when not in use it occupies a space of small front-to-back depth but can readily be opened to provide a space to accommodate a person, said cabinet including a back structure of smaller depth than said space, a tray pivotally attached to the back structure and movable downwardly and forwardly from a collapsed vertical position adjacent the back structure to a forwardly extended approximately horizontal position near floor level, means to apply a force to assist the closing movement of the tray, two side walls pivotally attached to the back structure on vertical axes and movable from collapsed positions adjacent the back structure to forwardly extended positions approximately at right angles where they serve as doors which overlap each other to the back structure with their front edges approximately in the same transverse vertical plane as the outer edge of the lowered tray, a support device attached to the back structure and including a transverse horizontal support member movable from a position adjacent the back structure to a forwardly extended approximately horizontal overhead position approximately into the same said transverse vertical plane, the forward and retracted positions of said member being in a common horizontal plane, means to prevent escape of water between the two side walls when extended and the tray, and a front closure member having its top edge carried by said support member and movable thereby from a collapsed position adjacent the back structure to a position at the front of the cabinet in the open condition.*

* * * * *